United States Patent
Chen

(10) Patent No.: US 6,910,709 B2
(45) Date of Patent: Jun. 28, 2005

(54) BI-DIRECTIONAL SAFETY LOCK STRUCTURE FOR STROLLERS FOLDING SINGLE-HANDEDLY

(75) Inventor: Er-Jui Chen, Kaohsiung Hsien (TW)

(73) Assignee: Link Treasure Limited, Tortola (BV)

( * ) Notice: Subject to any disclaimer, the term of this patent is extended or adjusted under 35 U.S.C. 154(b) by 50 days.

(21) Appl. No.: 10/378,753

(22) Filed: Mar. 5, 2003

(65) Prior Publication Data

US 2003/0168833 A1 Sep. 11, 2003

(30) Foreign Application Priority Data

Mar. 7, 2002 (TW) ........................................ 91202754 U

(51) Int. Cl.[7] .................................................. B62B 1/00
(52) U.S. Cl. ..................... 280/642; 280/655.1
(58) Field of Search .......................... 280/42, 647, 644, 280/649, 650, 655.1, 642, 657, 658; 16/408, 113.1; 74/501.6, 502

(56) References Cited

U.S. PATENT DOCUMENTS

| | | | | |
|---|---|---|---|---|
| 6,036,221 A | * | 3/2000 | Yang | 280/642 |
| 6,068,284 A | | 5/2000 | Kakuda | |
| 6,129,373 A | * | 10/2000 | Cheng | 280/647 |
| 6,339,862 B1 | * | 1/2002 | Cheng | 16/113.1 |
| 6,422,587 B1 | * | 7/2002 | Yamazaki et al. | 280/647 |
| 6,443,479 B2 | * | 9/2002 | Huang | 280/642 |
| 6,478,328 B1 | * | 11/2002 | Yeh et al. | 280/650 |
| 6,666,473 B2 | * | 12/2003 | Hartenstine et al. | 280/647 |

FOREIGN PATENT DOCUMENTS

CN          262689          11/1995

* cited by examiner

*Primary Examiner*—Bryan Fischmann
(74) *Attorney, Agent, or Firm*—Birch, Stewart, Kolasch & Birch, LLP

(57) ABSTRACT

A bi-directional safety lock structure for strollers folding single-handedly has a sliding element located above a depressing element to prevent the depressing element from moving and the single-handed operation structure from releasing in normal conditions. When releasing the constraint, the sliding element may be moved leftwards or rightwards to release the depressing element. Thus the structure is suitable for users of different hand using habits and improves operation convenience.

9 Claims, 8 Drawing Sheets

BI-DIRECTIONAL SAFETY LOCK STRUCTURE FOR STROLLERS FOLDING SINGLE-HANDEDLY

FIELD OF THE INVENTION

The invention relates to a bi-directional safety lock structure for strollers folding single-handedly to enable users to selectively release the single-handed folding structure leftwards or rightwards.

BACKGROUND OF THE INVENTION

Strollers generally may be extended to a usage state and collapsed to a folding state. When folding the stroller from the usage state to the folding state, the baby sitting in the stroller has to be taken out before the folding structure may be operated. In the event that the baby is still not capable of standing alone or walking, the user often has to hold the baby with one hand and operate the folding structure with the other hand, which is inconvenient. To remedy this problem, strollers that are foldable single-handedly have been developed. References can be found in U.S. Pat. No. 6,068,284 and R.O.C. publication No. 262689. In those structures, the frame collapses to the folding state after the operating structure is released. In order to prevent improper operations that result in accidental collapsing of the frame and cause injury to the baby sitting in the stroller, the conventional single-handed operation structures usually have a safety lock. The safety lock has to be released before the single-handed operation structure is actuated to release the frame. However, the commonly used safety locks can be released by operating in only one direction, and they are mostly designed to be operated by the thumb. When users have to hold the baby or goods with one hand and release the safety lock with the other hand, it is awkward and inconvenient. Sometimes users have to switch hands for holding the baby or goods, and use the other hand to release the unidirectional safety lock. This is a cumbersome operation.

SUMMARY OF THE INVENTION

The object of the invention is to provide a bi-directional safety lock structure to resolve the problems occurring with the conventional safety locks of single-handed folding mechanisms that can be operated only in one direction. The invention mainly has a sliding element that is slidable reciprocally in a transverse flute. The sliding element may be released by moving rightwards or leftwards to release the constraint on a depressing element and thereby actuate a release mechanism. As the sliding element may be moved rightwards or leftwards, it is more convenient for use. Thus accidental collapsing of the stroller may be avoided.

The foregoing, as well as additional objects, features and advantages of the invention will be more readily apparent from the following detailed description, which proceeds with reference to the accompanying drawings. The description and drawings are only to serve for reference and illustrative purposes, and are not intended to limit the scope of the invention.

DESCRIPTION OF THE PREFERRED EMBODIMENTS

Figure 1:
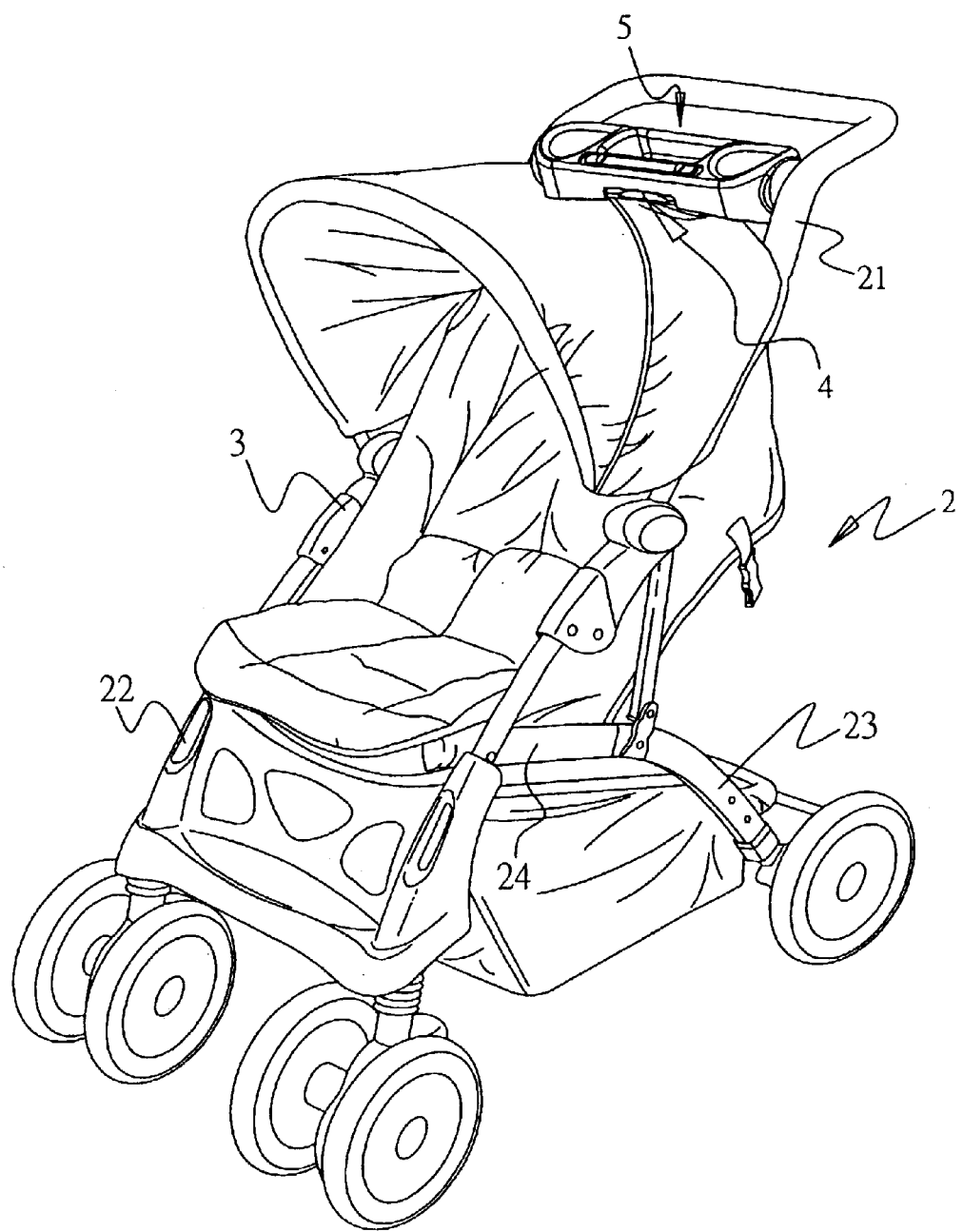
FIG. 1 is a schematic view of a conventional stroller.
Figure 2:
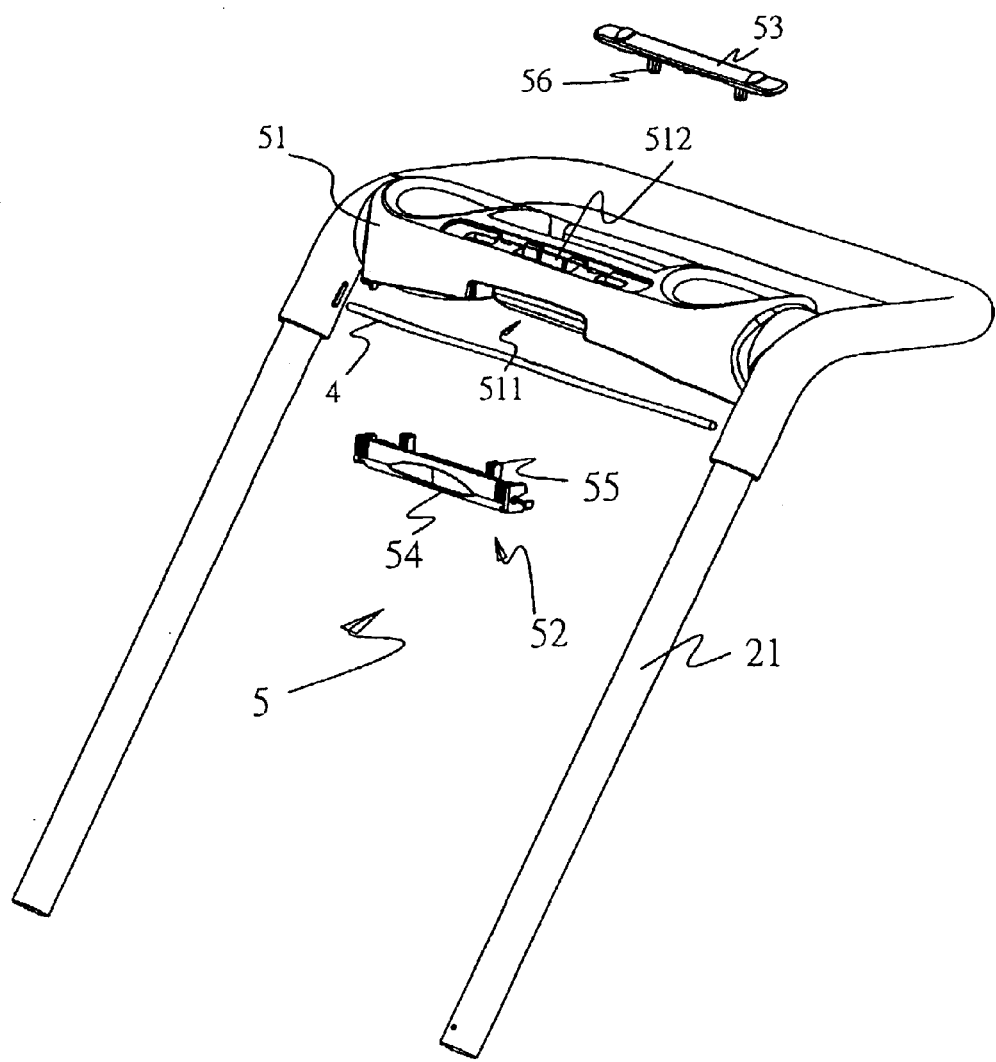
FIG. 2 is a schematic view of the invention adopted on a stroller.
Figure 3:
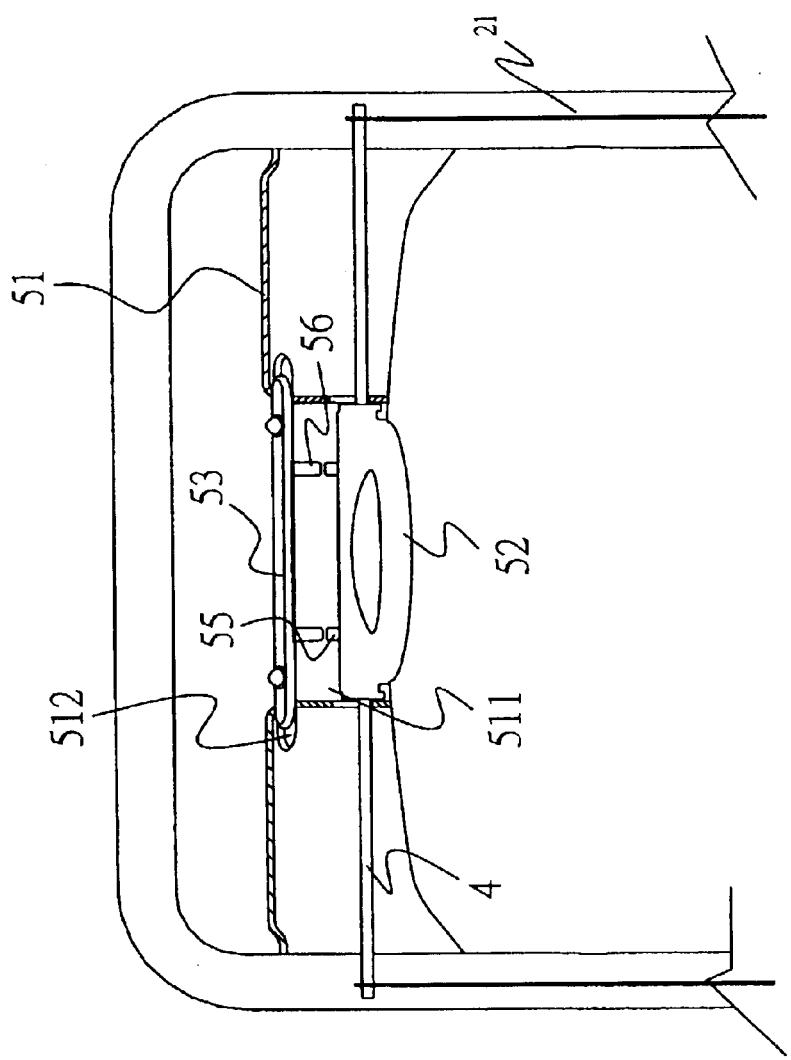
FIG. 3 is a perspective view of the invention.
Figure 5:
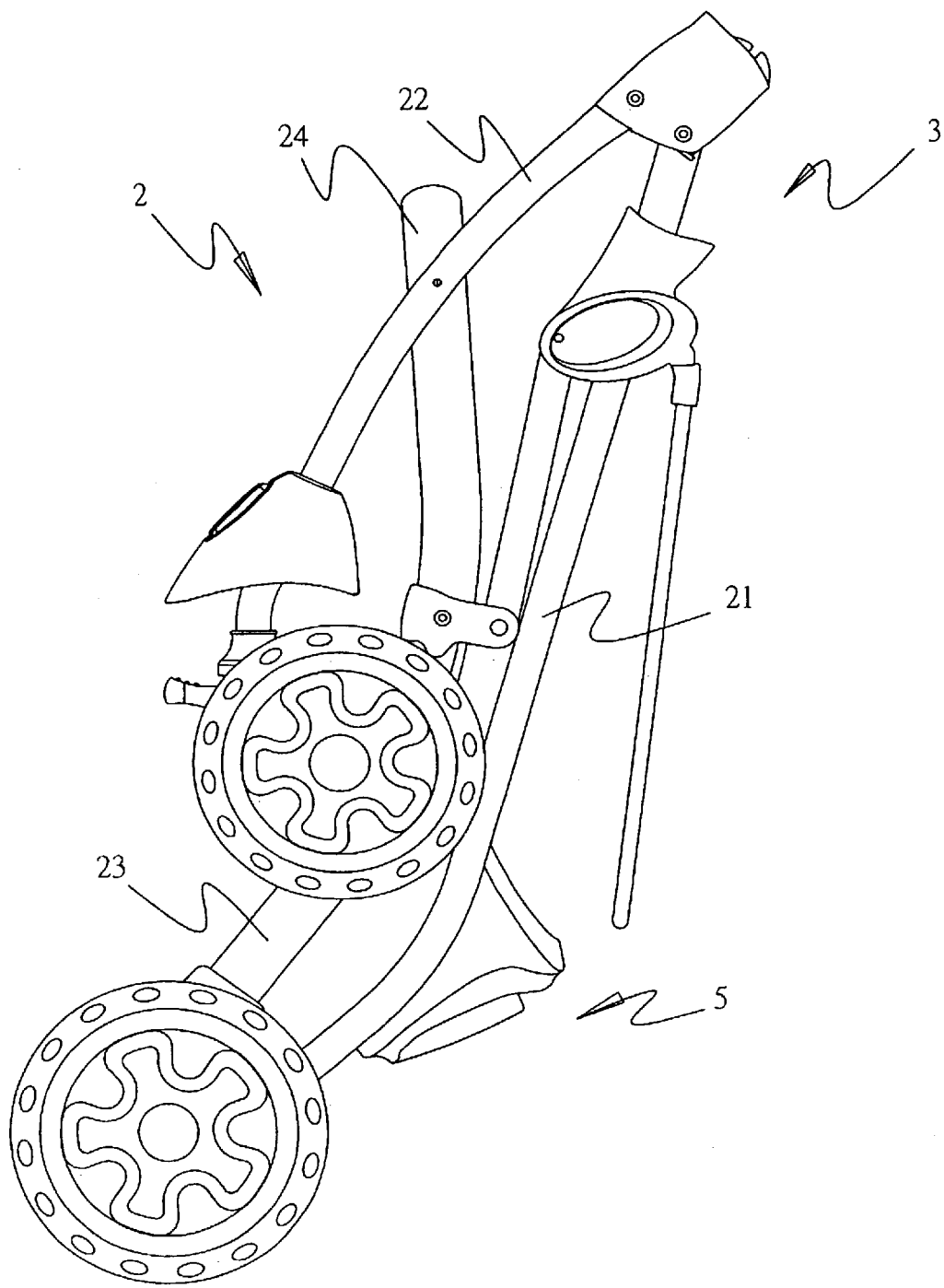
FIG. 5 is a fragmentary schematic view of the invention showing the joint set in a second embodiment.
Figure 6:
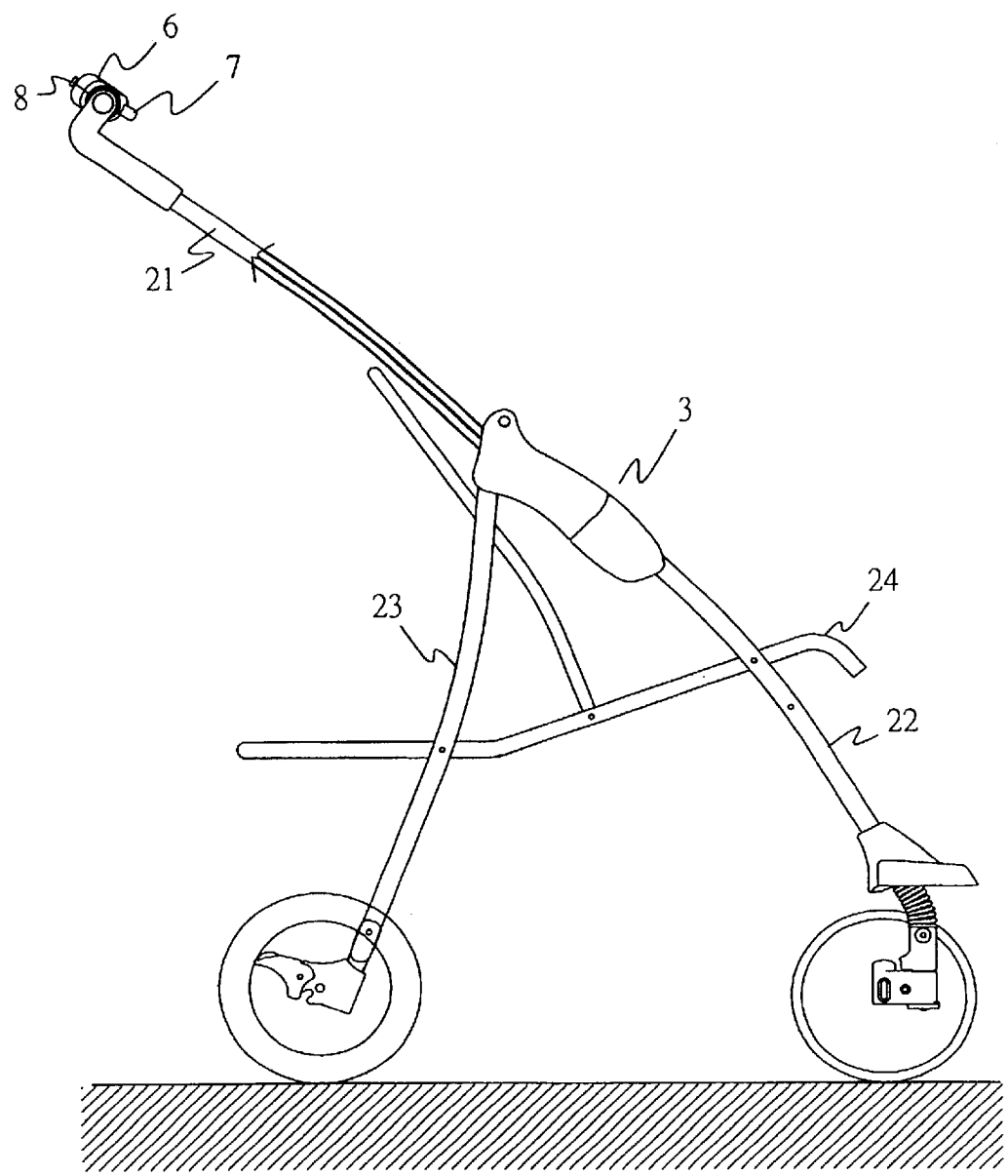
FIG. 6 shows a stroller in combination with a safety lock structure of the second embodiment of the present invention.
Figure 6A:
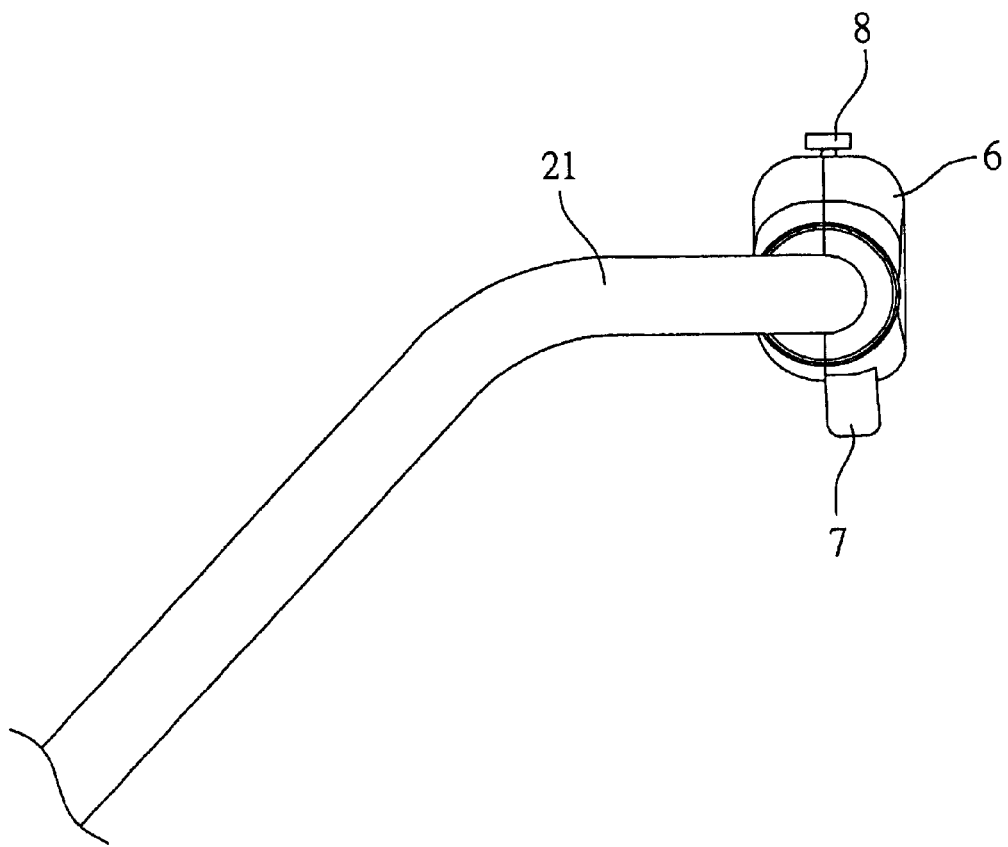
FIG. 6a is an exploded view of the safety lock structure of the second embodiment.
Figure 7:
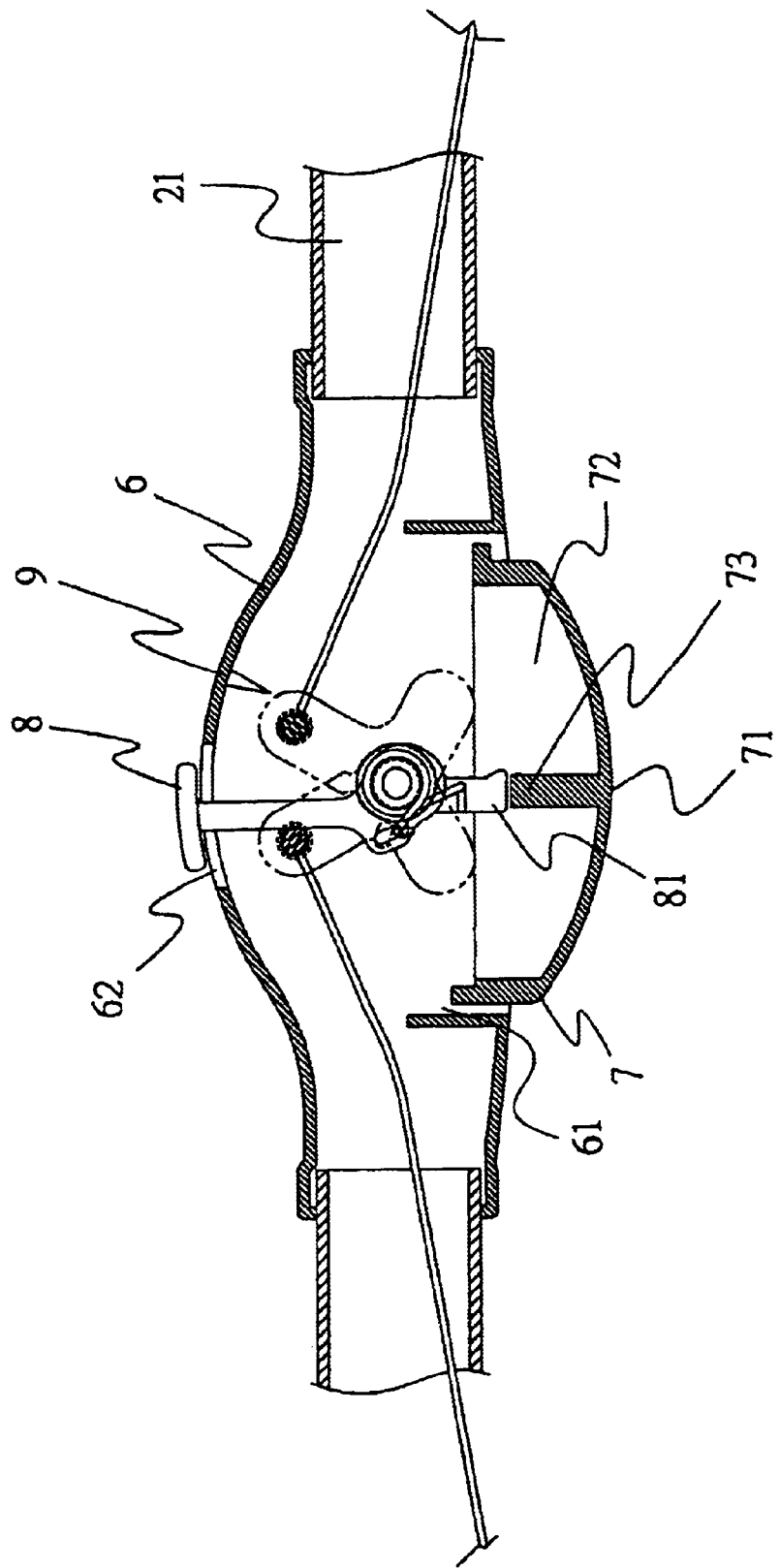
FIG. 7 is a schematic view of the rear support rack of the second embodiment in an operating condition.

Refer to FIGS. 1, 2 and 3 for a first embodiment of the invention. The bi-directional safety lock structure 5 for strollers folding single-handedly is mainly installed on a stroller frame 2, which can be folded single-handedly. The frame 2 includes a handle tube 21, front leg tubes 22, rear leg tubes 23, a seat tube 24, a pair of joint sets 3, a release mechanism 4 for releasing the joint sets 3 and a bi-directional safety lock structure 5 that pivotally engages with one another. The joint sets 3 mainly control folding and latching of various tubes. Through the release mechanism 4 (in this embodiment the release mechanism is a linkage bar driving linkage members located on two sides) the joint sets 3 located on two sides of the frame 2 may be driven and released to collapse the frame in a folding state (as shown in FIG. 5).

The bi-directional safety lock 5 mainly includes an element anchor dock 51, a depressing element 52 and a sliding element 53. In this embodiment the element anchor dock 51 is a serving tray which has at least a longitudinal flute 511 and a transverse flute 512.

The depressing element 52 is slidably located in the longitudinal flute 511 of the element anchor dock 51. The depressing element 52 is connected to the release mechanism 4 and has an operating section 54 for an operator to depress and actuate the release mechanism 4 and release the joint sets 3 to achieve the folding function. In addition, the depressing element 52 has an outer protruding section 55 extending upwards. The outer protruding section 55 in this embodiment is a ridge.

Figure 4:
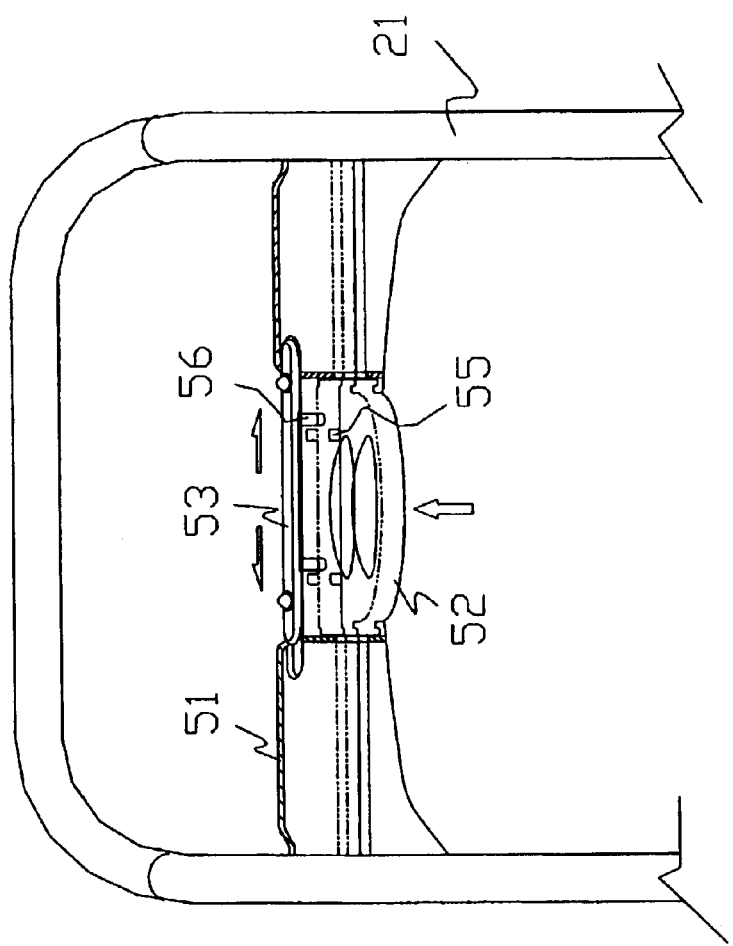
FIG. 4 is a fragmentary schematic view of the invention showing the joint set in a first embodiment.

The sliding element 53 is located above the depressing element 52 and is housed in the middle portion of the transverse flute 512 of the element anchor dock 51. The sliding element 53 has a bucking section 56 extending downwards corresponding to the outer protruding section 55 (formed in a strut in this embodiment). In normal conditions, the bucking section 56 of the sliding element 53 is in contact with the outer protruding section 55 of the depressing element 52 through an elastic element (not shown in the drawing) to prevent the depressing element 52 from moving and thereby prevent the frame 2 from accidentally collapsing. When releasing, the sliding element 53 may be moved leftwards or rightwards. The outer protruding section 55 of the depressing element 52 is free from the harness of the bucking section 56 of the sliding element 53, thus the depressing element 52 may be moved in the longitudinal flute 511 of the element anchor dock 51 (as shown in FIG. 4), and the release mechanism 4 may be driven to fold the frame.

Refer to FIGS. 5, 6, 6a and 7 for a second embodiment of the invention. The bi-directional safety lock of the invention mainly includes an element anchor dock 6, a depressing element 7 and a sliding element 8. The element anchor dock 6 is a shell mounted onto the handle tube 21 and has a first sliding flute 61 and a second sliding flute 62.

The depressing element 7 is slidably housed in the first sliding flute 61 of the element anchor dock 6. The depressing element 7 is connected to a release mechanism 9 (consisting of two L-shaped driving plates pivotally engaging with one another and movable interactively in this embodiment) and has an operating section 71 to enable users to actuate the release mechanism 9 and release the joint sets 3 of the frame to achieve the folding function. In addition, the depressing element 7 has two recesses 72 interposed by an outer protrusive section 73, which extends upwards to form a ridge.

The sliding element 8 is located above the depressing element 7 and is housed in the middle portion of the second sliding flute 62 of the element anchor dock 6. The sliding element 8 has a bucking section 81 extending downwards corresponding to the outer protruding section 73 of the depressing element 7. In normal conditions, the bucking section 81 of the sliding element 8 is in contact with the outer protruding section 73 of the depressing element 7 through an elastic element to prevent the depressing element 7 from moving and thereby prevent the frame 2 from accidentally collapsing. The sliding element 8 may be moved leftwards or rightwards to release the contact between the bucking section 81 and the outer protruding section 73. The outer protruding section 73 of the depressing element 7 is free from the harness of the bucking section 81 of the sliding element, thus the depressing element 7 may be moved in the first sliding flute 61 of the element anchor dock 6 and the release mechanism 9 may be driven to fold the frame 2.

By means of the construction set forth above, the bi-directional safety lock structure for strollers folding single-handedly according to the invention provides a sliding element movable leftwards or rightwards to enable users to release the safety mechanism and fold the stroller frame conveniently.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A bi-directional safety lock structure for strollers folding single-handedly to control a release mechanism of joint sets of a stroller frame, comprising:

an element anchor dock fastened to the stroller frame having a first sliding flute and a second sliding flute;

a depressing element slidable reciprocally in the first sliding flute to drive the release mechanism, the depressing element having an outer protrusive section extending upwardly; wherein the depressing element slides in the first sliding flute when subject to an external force to drive the release mechanism and actuate the joint sets of the stroller frame to activate stroller folding operation; and a sliding element two-way slidable reciprocally in the second sliding flute having a bucking section corresponding to the outer protrusive section of the depressing element; wherein the sliding element is at a static condition when located on a middle portion of the second sliding flute such that the bucking section presses the outer protrusive section to prevent the depressing element from sliding in the first sliding flute, and when the sliding element is moved leftwards or rightwards to release the outer protrusive section thereby the depressing element is movable under an external depressing force to actuate the release mechanism such that the joint sets are driven to activate the stroller folding operations, the sliding element being movable both leftwards and rightwards to release the outer protrusive section.

2. The bi-directional safety lock structure of claim 1, wherein the first sliding flute is a longitudinal sliding flute.

3. The bi-directional safety lock structure of claim 1, wherein the second sliding flute of the element anchor dock is a transverse sliding flute.

4. The bi-directional safety lock structure of claim 1, wherein the outer protrusive section is a ridge.

5. The bi-directional safety lock structure of claim 1, wherein the sliding element has a strut which is allowed to press the outer protrusive section of the depressing element.

6. The bi-directional safety lock structure of claim 1, wherein the element anchor dock is a tray.

7. The bi-directional safety lock structure of claim 1, wherein the element anchor dock is a shell fastening to a handle tube of the stroller frame.

8. The bi-directional safety lock structure of claim 1, wherein the sliding element is located on the middle portion of the second sliding flute through an elastic element and the sliding element is movable to two ends of the second sliding flute.

9. The bi-directional safety lock structure of claim 1, wherein the sliding element is linearly reciprocable in the second sliding flute.

* * * * *